United States Patent Office 3,657,424
Patented Apr. 18, 1972

3,657,424
FULL-FLAVORED CITRUS JUICE ENERGY SUPPLEMENT
Cedric Donald Aktins and John Allen Attaway, Winter Haven, Fla., assignors to State of Florida, Department of Citrus
No Drawing. Continuation-in-part of application Ser. No. 815,506, Apr. 11, 1969. This application Apr. 1, 1970, Ser. No. 24,820
Int. Cl. A61k 27/00
U.S. Cl. 424—153
10 Claims

ABSTRACT OF THE DISCLOSURE

A fortified citrus juice or other acid fruit juice is provided having increased amounts of sodium, calcium and chloride ions, beyond what is naturally present in the juice, in order to supplement the requirements of individuals having diminished amounts of these substance present in their body fluids.

---

This application is a continuation-in-part of application Ser. No. 815,506, filed Apr. 11, 1969, now abandoned.

This invention relates to fortified citrus juice or other acid fruit juice having a flavor closely similar to that of natural citrus juice and suitable for replenishing salts whose natural level in the body has been diminished, for example, due to strenuous physical activity. More specifically, this invention relates to fortified citrus juices which contain additional amounts only of those salts naturally present in the citrus juice in sufficient quantity to meet the physiological needs of individuals whose natural level of those salts is lower than normal without adversely effecting, to a significant degree, either palatability, flavor or factors associated with flavor such as acidity.

Vigorous physical activity, whether athletic or vocational, particularly when performed in a relatively high temperature environment, can lead to a loss of body fluids which results primarily in decreased volume of interstitial fluid in the body. If this is severe and progressive, the plasma volume also decreases. Whether or not the blood undergoes contraction depends upon the extent and nature of the electrolyte loss and the consequent changes in the electrolyte concentrations in the extracellular fluids. Those individuals working in very hot and humid environments may, for example, lose 10 to 14 liters daily as perspiration. In extreme cases of dehydration, over 900 milliequivalents of sodium, 820 milliequivalents chlorine, and 150 milliequivalents of potassium may be lost from the human body in twenty-four hours. This hypotonic fluid loss is accompanied by a decrease in sodium chloride content of the perspiration from a normal 40 to 80 milliequivalents per liter to as low as 2 to 5 milliequivalents per liter. Obviously, losses even remotely approaching these magnitudes cannot be tolerated by individuals for longer than brief periods of time. Further, these losses of electrolytes are in excess of those furnished in the normal diet and are not supplied by water alone when no provision is made for simultaneous replacement of the sodium, chlorine, potassium and calcium which have been lost.

It is known that citrus juices contain certain amounts of these calcium, sodium and potassium ions that are lost from the body as a result of heavy physical activity and that these ions are naturally present in amounts more than sufficient for buffering of the juices to taste, when the juices are not extended by appreciable dilution. For example, reconstituted frozen orange concentrate contains 9 milligrams of calcium, 1 milligram of sodium and 186 milligrams of potassium per 100 grams of reconstituted juice. Single-strength freshly extracted orange juice contain similar amounts of these ions with 10 milligrams of calcium, 1 milligram of sodium and 199 milligrams of potassium available per 100 grams of juice. Further, in extended clinical tests the natural electrolytes present in orange juices have been noted to supply in general the minimum requirements of a large part of the electrolytic profile and in addition many of the vitamins necessary for the actual tone or energy of the human body under normal circumstances.

U.S. Patent 3,114,641 to Sperti et al. discloses extended or diluted citrus juices wherein sodium and potassium phosphate, sodium citrate, and sodium succinate are used as buffers to control pH. Other salts such as calcium chloride, magnesium chloride and sodium and potassium citrate, and tartaric and maleic acids and their salts are used to enhance the flavor of the citrus juice.

The quantity of those salts present in the extended citrus juice of the Sperti et al patent and in natural citrus juices, while sufficient for buffering the flavor of the juice and providing many of the vitamins and electrolytic salts normally required by the human body is, however, not sufficient to meet the physiological needs of people whose bodies have been dehydrated, for example, as a result of strenuous physical activity with an associated loss of body salts. Attempts to prepare entirely synthetic solutions to supplement the depleted level of these salts in individuals have not been altogether successful and in some cases highly detrimental to the well being of individuals with certain physical disorders which may be undetected. Neither has the addition of vitamins and minerals present in the peel of citrus fruits proved a satisfactory solution to the problem.

It is therefore the object of the present invention to provide citrus juices, with increased amounts, beyond what is naturally present, of certain ions naturally present in the unaltered citrus juice in order that the loss of these ions from the bodies of individuals may be supplemented.

According to the present invention, citrus juices which can be in a variety of forms and strengths, are fortified by the addition of sodium and calcium salts and chloride ions in amounts sufficient to replace those elements depleted below the natural level from the individual's body fluids. Relatvely small amounts of potassium can also be added to fortify the citrus juice of this invention, although, generally the amount of this element naturally present in the juice is sufficient to replace depletions in the human body and added amounts of potassium salts in excess of about 0.003 weight percent, based on the weight of the natural juice should be avoided as excessive amounts of potassium can prove harmful to some individuals.

The sodium and calcium salts employed in this invention can be, for example, chlorides, citrates or phosphates, although, advantageously, the chlorides are used since this will provide the chloride ion supplement in addition to supplying the sodium and calcium ions. Where small amounts of potassium ions are desired to be added to the citrus juice of this invention, potassium chloride may advantageously be used.

The amount of supplementary salts which are added to citrus juice according to the present invention may vary somewhat, however, no excess of these ions beyond that possible or that will significantly effect the palatability or acidity of the juice should be included in the fortified citrus juices of this invention. Thus, the combined amount of the salts of this invention which are added to citrus juice does not exceed about 0.2 weight percent. Maximum permissible amounts of the respective individual salts which are added is about 0.18 weight percent of the sodium salt, and about 0.04 weight percent of the calcium salt. Minimum effective amounts of the sodium salt is about 0.019 weight percent. Calcium salt in the amount of 0 to 0.04 and potassium salt in the amount of 0 to 0.04 weight percent can be added. All weight percents are based on the weight of the final citrus beverage.

Juices which can be employed according to the present invention can be any of the juices of various citrus type fruits, for example, orange, grapefruit, lemon or lime, or other acid fruit juice. The juices of these fruits can be employed in their fresh full strength form, diluted or as frozen concentrates intended for reconstitution into full strength juice.

It is an additional feature of the present invention that it has been found that fortified beverages can be prepared by reducing the insoluble solids content in the natural full strength juice which is employed, for example, to as low as about 1 percent by volume and preferably about 2 to 10 percent by volume. Thus, for example, a fortified citrus beverage can be prepared according to the present invention having a reduced citrus pulp content as low as about 2 percent by volume based on the volume of the beverage. These fortified, low pulp citrus drinks have been found to be particularly acceptable among athletes and others desiring a beverage which does not have the "bulk" or "body" of full strength citrus juice.

It is still a further feature of the present invention that sufficient dry citrus solids can be mixed with the salts of the present invention to give a dry product to which water can be added to produce a reconstituted, fortified citrus beverage containing about 1–15 weight percent, preferably about 5–12, citrus solids weight percent based on the weight of the reconstituted juice.

Although it is possible, according to the present invention, to maintain substantially the natural flavor and palatability of citrus juices by supplementing the amounts of certain salts present in the juice, it may nevertheless be desired to add sweeteners to the juice. Suitable sweeteners can be any of the various natural or synthetic types employed in the art. In addition, natural citrus oils can also be added to the various compositions of the present invention, for example, in amounts of about 0.012–0.016 percent by volume. A typical citrus oil which can be employed in this manner is, for example, cold pressed orange oil.

The following examples describe a typical supplemented citrus juice of the present invention having substantially the taste of the full strength natural juice and serving to replenish the loss of natural salts in the body.

EXAMPLE 1

Preparation of full-strength, 12° Brix orange juice energy supplement

A sufficient quantity of high Brix Valencia orange or Pineapple orange concentrate was reconstituted to obtain about 120 gallons of 12° Brix juice. Sinking pulp content above 10% by volume was removed by passing part of the juice through a high-speed centrifuge. This centrifuged juice, containing about 2% pulp was then added back to adjust the overall pulp level to 10% by volume. In the event that a 2% pulp is desired, all of the juice would be passed through the centrifuge. To 100 gallons of this juice, Valencia orange peel oil was added to adjust the total oil content to about .014% by volume. Chloride salts were then added as follows:

|  | G./gal. |
|---|---|
| Sodium chloride | 1.5142 |
| Potassium chloride | 0.5677 |
| Calcium chloride | 0.6433 |
| Total | 2.7252 |

Weight of 1 gal of 12° Brix juice=3972 g.

| Ingredients | Weight in grams | Weight percent |
|---|---|---|
| 1 gallon 12° Brix juice | 3,972.0000 | 99.9250 |
| Sodium chloride | 1.5142 | .0381 |
| Potassium chloride | 0.5677 | .0143 |
| Calcium chloride | 0.6433 | .0162 |
| Orange peel oil (0.3 ml.) | 0.2520 | .0063 |

The total weight percent of chloride salts added to the 12° Brix product is 0.0686 percent. The juice was then heat-treated by passing it through a suitable heat exchange unit. It was then filled hot into cans or glass bottles, capped, and then cooled under a water spray. An alternate method to heat treatment and hot filling was the method of aseptically cold filling followed by refrigerated storage. In this method about 0.1% by weight sodium benzoate was added as a preservative. The juice was then cold-filled into sterilized cans or glass bottles and kept in refrigerated storage.

EXAMPLE 2

Preparation of a 10.2° Brix citrus juice energy supplement

A sufficient quantity of high Brix orange concentrate was reconstituted to obtain about 120 gallons of 10.2° Brix single-strength juice. Alternatively freshly extracted juice was also blended with the reconstituted juice to obtain the desired 10.2° Brix. Juice with this soluble solids content and 2% pulp by volume was found to be the most suitable for athletes when undergoing strenuous exercise. To obtain a 10% by volume pulp, part of the 120 gallons was centrifuged and added back to adjust the pulp level to 10%. 2% pulp level was obtained by centrifuging all of the juice. To 100 gallons of this juice containing 2% pulp, peel oil was added to adjust the total oil content to .009–.015% by volume. Chloride salts are then added as follows:

|  | G./gal. |
|---|---|
| Sodium chloride | 1.5142 |
| Potassium chloride | 0.5677 |
| Calcium chloride | 0.6433 |
| Total | 2.7252 |

Weight of one gallon of 10.2° Brix juice=3944 grams.

| Ingredients | Weight in grams | Weight percent |
|---|---|---|
| 1 gallon 10.2° Brix juice | 3,944.0000 | 99.9245 |
| Sodium chloride | 1.5142 | .0384 |
| Potassium chloride | 0.5677 | .0144 |
| Calcium chloride | 0.6433 | .0163 |
| Orange peel oil (0.3 ml.) | 0.2520 | .0064 |

The total weight percent of chloride salts in the 10.2° Brix product was 0.0691 percent. The juice was then heat-treated by passing it through a suitable heat exchange unit. It was then filled hot into cans or glass bottles, capped, and then cooled under a water spray. An alternate method employed was to aseptically cold fill followed by refrigerated storage. In this method 0.1 weight percent sodium benzoate was added as a preservative. The juice was then cold filled into sterilized cans or glass bottles and kept in refrigerated storage.

EXAMPLE 3

Preparation of an orange drink energy supplement

A sufficient quantity of orange concentrate was used to first obtain 11.8° Brix orange juice. In this case approximately 15.75 gallons of 11.8° Brix juice was prepared. To obtain a dilution containing 51% by volume of the orange juice, 15.13 gallons of water was added for a total volume of 30.88 gallons. Since a low pulp content was desirable, the diluted juice was centrifuged to reduce the pulp content to 2% by volume. Five fold orange peel oil was added to 25 gallons of the product for an .008 to .012% range by volume. The resulting juice Brix was 6.20° and the ratio 16.75 which indicated no sweetener was required. In the event the ratio is below 16.0, soluble saccharin may be added for ratio adjustment. Chloride salts were added as follows:

|  | G./gal. |
|---|---|
| Sodium chloride | 1.5142 |
| Potassium chloride | 0.5677 |
| Calcium chloride | 0.6433 |
| Total | 2.7252 |

The weight of 1 gallon of 6.20° Brix juice=3881 grams.

| Ingredients | Weight in grams | Weight percent |
|---|---|---|
| 1 gallon 6.20° Brix juice | 3,881.0000 | 99.9255 |
| Sodium chloride | 1.5142 | .0389 |
| Potassium chloride | 0.5677 | .0146 |
| Calcium chloride | 0.6433 | .0166 |
| 5-fold orange peel oil (0.2 ml.) | 0.1680 | .0043 |

The total weight percent of chloride salts in the 6.20° Brix product was .070 percent. The juice was then heat-treated by passing it through a suitable heat exchange unit and then filled hot into cans or glass bottles, capped, and cooled under a water spray. An alternate method to heat treatment and hot filling is the method of aseptically cold filling followed by refrigerated storage. In this method, sodium benzoate is added as a preservative. Not more than 0.1% by weight in the product is used to effectively prevent spoilage. The juice is then cold-filled into sterilized cans or glass bottles and kept in refrigerated storage.

EXAMPLE 4

Preparation of a grapefruit drink energy supplement

A sufficient quantity of grapefruit concentrate having a ratio of 7.0 or higher was reconstituted to obtain 16 gallons of 9.5° Brix juice. To obtain a dilution containing 51% by volume of the grapefruit juice, the reconstituted juice was mixed with 15.4 gallons of water. Since a low pulp was desirable, all of the diluted juice was centrifuged to reduce the sinking pulp content to 2% by volume. When a higher pulp content is desired, centrifuging may be omitted. Grapefruit peel oil was added for an .005 to .009% range. Twenty-five gallons of the product was then taken for processing. The resulting juice Brix was 5.1° and the ratio 12.8. The ratio was then adjusted to 15.0 by the addition of 1.8 grams of soluble saccharin and chloride salts were then added as follows:

|  | G./gal. |
|---|---|
| Sodium chloride | 1.5142 |
| Potassium chloride | 0.5677 |
| Calcium chloride | 0.6433 |
| Total | 2.7252 |

The weight of 1 gallon of 5.1° Brix juice=3865 grams.

| Ingredients | Weight in grams | Weight percent |
|---|---|---|
| 1 gallon 5.1° Brix juice | 3,865.0000 | 99.9264 |
| Sodium chloride | 1.5142 | .0392 |
| Potassium chloride | 0.5677 | .0147 |
| Calcium chloride | 0.6433 | .0166 |
| Grapefruit peel oil | 0.1200 | .0031 |

The total weight percent of chloride salts in the 5.1° Brix product was .071 percent. The juice was then heat-treated by passing it through a suitable heat exchange unit and then filled hot into cans or glass bottles, capped, and cooled under a water spray.

EXAMPLE 5

| Supplementary ingredients: | Milligrams per 1000 grams full strength orange juice of 12.8° Brix |
|---|---|
| Sodium chloride | 1000 |
| Potassium chloride | 15 |
| Calcium chloride | 150 |

Juice prepared having the above-noted composition was found to have substantially the flavor of the natural full-strength juice and to replenish lost natural occurring salts in the human body.

What is claimed is:

1. A fortified citrus juice comprising natural citrus juice and up to about 0.019 to 0.18 weight percent added sodium chloride, about 0–0.04 weight percent added potassium chloride, and about 0–.04 weight percent added calcium chloride, said weight percents being based on the weight of the fortified citrus juice; said salts being further present in a total amount of up to 0.2 weight percent and in sufficient amounts to replace depletion below the natural level of these salts from the body fluids of a person.

2. The fortified citrus juice of claim 1, wherein said juice is the full strength liquid.

3. The fortified citrus juice of claim 1, wherein said juice has been processed to a frozen concentrate.

4. The fortified citrus juice of claim 1 wherein the citrus juice is orange juice.

5. The fortified citrus juice of claim 1, wherein said natural citrus juice contains about 1–15% by weight citrus solids.

6. The fortified citrus juices of claim 5, wherein said citrus juice contain about 5–12 percent by weight soluble solids.

7. The fortified citrus juice of claim 1, which contains down to about 1% by volume pulp.

8. The fortified citrus juice of claim 7, which contains about 2–10 percent by volume pulp.

9. A dry mixture, suitable for reconstituting the water into a fortified citrus juice, which comprises citrus solids and additional amounts beyond that naturally present in said solids, of sodium, calcium and potassium chlorides; said citrus solids being present in amount sufficient that the reconstituted juice will contain about 1 to 15 weight percent of said soluble citrus solids and said chlorides being present in sufficient amounts that the reconstituted juice will contain about 0.019 to .18 weight percent sodium chloride, about 0 to .04 weight percent calcium chloride and 0 to .04 weight percent potassium chloride, said weight percents being based on the weight of the fortified reconstituted citrus juice; and the total weight of said added chlorides being up to about 0.2 weight percent and sufficient to replace depletion below the natural level of these chlorides from the body fluids of persons.

10. The fortified citrus juice of claim 1 which contains a total of about 0.012–0.016 percent by volume of peel oil or other flavoring oils.

References Cited

UNITED STATES PATENTS

| 2,224,252 | 12/1940 | Gallaway | 99—1 |
| 3,114,641 | 12/1963 | Sperti et al. | 99—105 |

STANLEY J. FRIEDMAN, Primary Examiner

U.S. Cl. X.R.

99—1, 28, 78, 105; 424—149